July 27, 1954  J. A. BRAWLEY  2,684,606
COMBINATION SELF-THREADING EASY OUT AND LOCK NUT
Filed March 17, 1952
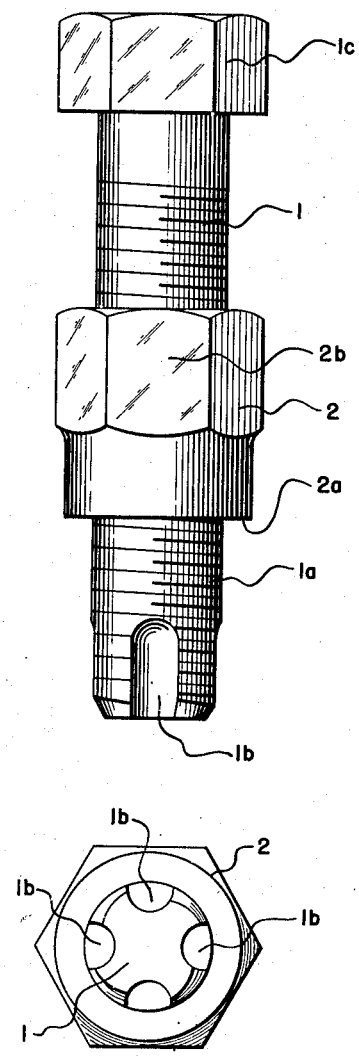
FIG. 1
FIG. 3
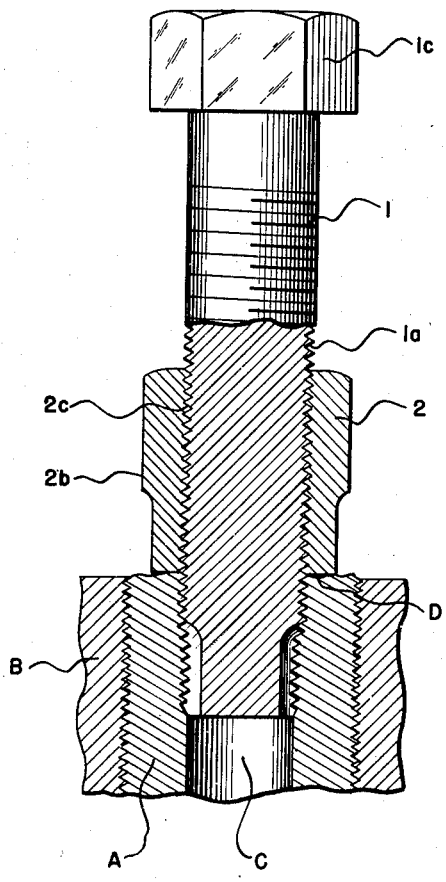
FIG. 2
INVENTOR.
JACK A. BRAWLEY
BY
Wm. H. Dean
AGENT Patented July 27, 1954

2,684,606

UNITED STATES PATENT OFFICE 2,684,606

COMBINATION SELF-THREADING EASY OUT AND LOCK NUT

Jack A. Brawley, San Diego, Calif., assignor of one-fifth to Eugene A. Lafreniere, Escondido, Calif.

Application March 17, 1952, Serial No. 277,009

2 Claims. (Cl. 81—71)

My invention relates to a combination self-threading easy out and lock nut and the objects of my invention are:

First, to provide an easy out of this class having a straight self threading tap combined with a lock nut screw threadably adjustable thereon for removing broken bolts or studs from members in which they are screw threadably engaged.

Second, to provide an easy out and lock nut of this class in which the straight self-threading tap may be threaded into a broken stud to the desired position and then may be securely locked by forceful tightening of the lock nut, screw threaded thereon whereby said lock nut is jammed against the end of the broken stud being removed, placing longitudinal shear stresses on the threads of the tap, thus preventing longitudinal or rotational displacement of the easy out in connection with the broken stud being removed.

Third, to provide an easy out and lock nut of this class in which the thread of the self threading easy out may be opposed to that of the broken stud being removed whereby forceful application of a wrench to the lock nut on the easy out may be applied for removing the broken stud from any structure in which it is screw threadably engaged.

Fourth, to provide a combination easy out and lock nut of this class which is very simple and easy to operate and which is very positive and forceful.

Fifth, to provide a combination self-threading easy out and lock nut of this class which may be economically produced in a great variety of sizes to accommodate operations on broken studs or bolts of a great variety of sizes, and Sixth, to provide a combination self threading easy out and lock nut of this class which is very simple and economical of construction, efficient in operation and which will not readily deteriorate or get out of order.

With these and other objects in view as will appear hereinafter, my invention consists of certain novel features of construction, combination and arrangement of parts and portions as will be hereinafter described in detail and particularly set forth in the appended claims, reference being had to the accompanying drawings and to the characters of reference thereon, forming a part of this application in which:

Fig. 1 is a side elevational view of my combination self-threading easy out and lock nut;

Fig. 2 is a longitudinal sectional view thereof showing portions in elevation to facilitate the illustration and showing a broken stud with which my combination self-threading easy out and lock nut is engaged, and;

Fig. 3 is an end view of my combination self-threading easy out and lock nut showing the self threading tap end thereof.

Similar characters of reference refer to similar parts and portions throughout the several views of the drawings.

The tap 1 and lock nut 2 constitute the principal parts and portions of my combination self-threading easy out and lock nut.

The self threading tap 1 is a straight cylindrical external threaded tap having self-tapping threads 1a which are provided with a plurality of flutes 1b to provide chip clearance when the tap is being threaded into a drilled hole. The lock nut 2 is provided with a stud engaging shoulder 2a and a hexagonal head portion 2b on which a wrench may be applied for tightening the same and also turning the tap 1 together therewith when engaged with a stud. The nut 2 as shown in Fig. 2 of the drawings is provided with an internal screw thread 2c engaging the external screw threads 1a on the tap 1. The opposite end of the tap 1 from the fluted self threaded portions 1b is provided with a hexagonal head 1c adapted to be engaged by a wrench for turning the self-threading end of the tap 1 into a drilled hole.

The operation of my combination self-threading easy out and lock nut is substantially as follows:

When it is desired to remove a broken stud A, from an internally screw threaded structure B, a hole C is drilled in the stud A and the fluted portions 1b of the tap 1 are threaded into the hole C by means of the head 1c to which a wrench may be applied. It will be noted that the threads 1a are normally left hand threads so that the nut 2 when tightened against the surface D of the stud A may be tightened in a direction which will cause removal of the stud A. Increased application of force to the nut 2 by means of a wrench engaging the hexagonal portion thereof increases the engagement of the nut 2 with the stud A, and the straight threaded portion of the tap 1 is directly in longitudinal shear and due to their straight axial relationship with the stud A they do not tend to spread the stud A about its center but merely exert axial force when the nut 2 is tightened.

Though I have shown and described a particular construction combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In a self-threading easy out for removing a stud provided with an axial bore, a cylindrical tap portion for insertion in the bore of a stud to be removed said tap portion being threaded in the direction opposite to the threading of the stud, and a lock nut screw threaded on the screw threaded portion of said tap portion, said nut having a stud-engaging face.

2. In a self-threading easy out having a straight cylindrical externally threaded tap portion for insertion in the bore of a stud to be removed and a lock nut screw threaded on the screw threaded portion of said tap portion, said nut having a stud-engaging face, the threads of said tap portion being of opposite hand to the threads on a stud engaged thereby, whereby force applied to said nut in abutment with a stud being removed causes increased engagement with such a stud and longitudinal shear stresses in the threads of said tap portion projected into the stud.

References Cited in the file of this patent

UNITED STATES PATENTS

| Number | Name | Date |
| --- | --- | --- |
| 379,213 | Firth et al. | Mar. 13, 1888 |
| 777,446 | Strehl | Dec. 13, 1904 |
| 1,458,076 | Potts | June 5, 1923 |
| 1,785,847 | Valentine | Dec. 23, 1930 |
| 2,281,164 | Maling | Apr. 28, 1942 |
| 2,641,948 | Braendel | June 16, 1953 |